United States Patent
Capanni et al.

(10) Patent No.: US 11,859,607 B2
(45) Date of Patent: Jan. 2, 2024

(54) FULLY ACTUATED VALVE FOR A RECIPROCATING MACHINE AND RECIPROCATING MACHINE INCLUDING SAID VALVE

(71) Applicant: NUOVO PIGNONE TECNOLOGIE—S.R.L., Florence (IT)

(72) Inventors: Alessio Capanni, Florence (IT); Douglas M. Mcclure, Florence (IT); Federico Puccinelli, Florence (IT); Riccardo Maleci, Florence (IT); Stephen J. Waymeyer, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 112 days.

(21) Appl. No.: 17/593,984

(22) PCT Filed: Apr. 1, 2020

(86) PCT No.: PCT/EP2020/025156
§ 371 (c)(1),
(2) Date: Sep. 29, 2021

(87) PCT Pub. No.: WO2020/200524
PCT Pub. Date: Oct. 8, 2020

(65) Prior Publication Data
US 2022/0056904 A1    Feb. 24, 2022

(30) Foreign Application Priority Data

Apr. 3, 2019  (IT) .......... 102019000004978

(51) Int. Cl.
*F04B 53/10* (2006.01)
*F04B 39/08* (2006.01)
(Continued)

(52) U.S. Cl.
CPC .......... *F04B 53/1022* (2013.01); *F04B 39/08* (2013.01); *F04B 39/10* (2013.01); *F16K 31/0675* (2013.01)

(58) Field of Classification Search
CPC ........ F04B 7/0076; F04B 39/08; F04B 39/10; F04B 39/1053; F04B 53/1022;
(Continued)

(56) References Cited

U.S. PATENT DOCUMENTS 1,302,084 A * 4/1919 Peters ............... F16K 15/12
                                                          137/516.13
1,769,899 A * 7/1930 Mathews ........... F16K 15/12
                                                          137/512.1
(Continued)

FOREIGN PATENT DOCUMENTS

DE    1039326 B    9/1958
EP    2206941 A1   7/2010
(Continued)

*Primary Examiner* — Matthew W Jellett
(74) *Attorney, Agent, or Firm* — Paul Frank + Collins P.C.

(57) ABSTRACT

A valve for a reciprocating machine is disclosed. The valve includes a seat provided with flow apertures therein. A valve closing member is adapted to co-act with the seat for selectively closing and opening the flow apertures. A cage is connected to the seat and forms a guide, in which the actuation stem of a valve closing member is slidingly engaged and guided.

13 Claims, 9 Drawing Sheets

(51) Int. Cl.
*F04B 39/10* (2006.01)
*F16K 31/06* (2006.01)

(58) Field of Classification Search
CPC ..... Y10T 137/87265; Y10T 137/87507; Y10T 137/87418; Y10T 137/87426; Y10T 137/87539; F16K 31/0658; F16K 31/0693; F16K 31/0648; F16K 41/02; F16K 41/04; F16K 41/08
USPC .................................................... 251/129.16
See application file for complete search history.

(56) References Cited

U.S. PATENT DOCUMENTS

| | | | | |
|---|---|---|---|---|
| 2,165,938 | A * | 7/1939 | Noble | F04B 39/08 |
| | | | | 417/253 |
| 2,907,344 | A * | 10/1959 | Sochting | F04B 49/243 |
| | | | | 137/601.01 |
| 2,957,620 | A * | 10/1960 | Turnwald | F04B 49/03 |
| | | | | 417/454 |
| 3,294,314 | A * | 12/1966 | Ott | F04B 39/08 |
| | | | | 417/446 |
| 3,602,247 | A * | 8/1971 | Bunn | F16K 15/06 |
| | | | | 137/512.1 |
| 4,447,193 | A | 5/1984 | Bunn | |
| 4,632,145 | A * | 12/1986 | Machu | F04B 49/243 |
| | | | | 137/516.21 |
| 4,703,772 | A * | 11/1987 | Ostermann | F16K 15/16 |
| | | | | 137/516.21 |
| 4,799,507 | A * | 1/1989 | Hrabal | F16K 15/16 |
| | | | | 137/516.21 |
| 4,869,291 | A * | 9/1989 | Hrabal | F04B 39/1053 |
| | | | | 137/516.21 |
| 5,398,724 | A * | 3/1995 | Vars | F02M 21/0272 |
| | | | | 137/625.33 |
| 6,112,765 | A * | 9/2000 | Boyer | F02M 21/0272 |
| | | | | 137/554 |
| 7,331,767 | B2 * | 2/2008 | Spiegl | F04B 39/08 |
| | | | | 417/446 |
| 8,272,399 | B2 * | 9/2012 | Farrow | F02M 51/0642 |
| | | | | 137/601.02 |
| 8,500,420 | B2 * | 8/2013 | Spiegl | F04B 39/08 |
| | | | | 417/446 |
| 8,720,488 | B2 * | 5/2014 | Ranegger | F02M 21/0272 |
| | | | | 137/625.33 |
| 9,377,018 | B2 * | 6/2016 | Mangiagli | F04B 39/08 |
| 9,562,527 | B2 * | 2/2017 | Spiegl | F04B 49/03 |
| 9,567,994 | B2 * | 2/2017 | Spiegl | F16K 31/0655 |
| 9,765,770 | B2 * | 9/2017 | Babbini | F16K 15/08 |
| 10,197,179 | B2 * | 2/2019 | Schiavone | F04B 39/08 |
| 2007/0272890 | A1 | 11/2007 | Kopecek et al. | |
| 2011/0041929 | A1 | 2/2011 | Moore | |
| 2012/0152379 | A1 * | 6/2012 | Lagler | F16K 15/08 |
| | | | | 137/511 |
| 2013/0160641 | A1 | 6/2013 | Bagagli et al. | |
| 2018/0031138 | A1 | 2/2018 | Schiavone | |

FOREIGN PATENT DOCUMENTS

| | | |
|---|---|---|
| FR | 768331 A | 8/1934 |
| WO | 2011/009880 A1 | 1/2011 |
| WO | 2012/122203 A2 | 9/2012 |
| WO | 2016/184827 A1 | 11/2016 |

\* cited by examiner

FULLY ACTUATED VALVE FOR A RECIPROCATING MACHINE AND RECIPROCATING MACHINE INCLUDING SAID VALVE

TECHNICAL FIELD

Embodiments disclosed herein generally relate to actuated valves for reciprocating machines, specifically for reciprocating compressors.

BACKGROUND ART

Compressors are machines used to increase the pressure of a compressible fluid; their use is widespread in several technical fields, among which in particular oil and gas industry.

Compressors may be classified in two main categories, namely dynamic compressors and positive displacement compressors. In dynamic compressors the gas is compressed by transferring kinetic energy from a rotating element, such as an impeller or a bladed wheel, to the gas being compressed. The kinetic energy of the gas is then converted into pressure by slowing the gas. Typical dynamic compressors are centrifugal compressors and axial compressors. In positive displacement compressors the gas pressure is increased by trapping the gas in a volume and reducing the volume. Exemplary positive displacement compressors are screw compressors, vane compressors and reciprocating compressors.

Reciprocating compressors comprise a cylinder and a piston slidingly arranged in the cylinder for reciprocatingly moving therein. The piston and the cylinder form a single or a double compression chamber. If a single compression chamber is formed, the reciprocating compressor is termed single-acting reciprocating compressor. If two compression chambers are defined by the cylinder and the piston, the compressor is referred to as a double-acting reciprocating compressor. Each compression chamber is fluidly coupled to a suction duct or to a suction plenum to suck compressible fluid therefrom, and to a delivery duct or to a delivery plenum, to deliver compressed fluid therein.

Each compression chamber comprises at least one suction valve adapted to selectively place the compression chamber in fluid communication with the suction duct or the suction plenum. Each compression chamber further comprises at least one discharge valve adapted to selectively place the compression chamber in fluid communication with the discharge duct or the discharge plenum.

Usually, reciprocating compressors use automatic suction valves and automatic discharge valves. In an automatic valve a valve closing member is biased in a closing position by one or more resilient members, such as coil springs. The valve opens when the difference of the fluid pressures acting upon opposing sides of the closing member overcomes the resilient force applied by the resilient member.

In some embodiments, for better control of the suction, compression and discharge phases of the compression cycle, valves for reciprocating compressors are actuated by connecting the closing member to an actuator. In this way opening and closing of the valve can be controlled at least during part of the compression cycle, independently of the pressure differential across the valve. Exemplary embodiments of actuated valves in reciprocating compressors are disclosed in US2013/0160641 and US2007/0272890. Actuated valves are used for instance as suction valves. The actuator of the suction valve can act upon the suction valve such that the valve is maintained in the open condition during at least a fraction of the compression phase. This control is used to modulate the flowrate of reciprocating compressors. During a portion of the compression stroke of the piston, the suction valve is forced in the open position, such that part of the fluid collected in the compression chamber flows back through the suction duct or suction plenum, and the amount of gas compressed in each compression cycle is reduced. The flowrate of the compressor can thus be modulated.

Actuated valves of the current art are cumbersome and can be prone to malfunctioning.

Improvements in actuated valves for reciprocating machines, to ameliorate the overall efficiency of the valves, or more generally to remove or alleviate one or more of the drawbacks of the valves of the current art would therefore be welcomed.

SUMMARY

According to one aspect, the present disclosure concerns a valve for a reciprocating machine, comprising a seat provided with flow apertures therein. The valve further includes a valve closing member, adapted to co-act with the seat for selectively closing and opening said apertures. A cage is integrally coupled to said seat. In some embodiments, the cage and the seat are formed monolithically as a single body in one and the same manufacturing step, for instance by additive manufacturing. In other embodiments, the cage and the seat can be manufactured separately and thereafter connected rigidly to one another to form an integral body, i.e. a rigid component.

In some embodiments, the valve closing member comprises an actuation stem, slidingly arranged in a guide integrally connected to the cage. The guide can be in the form of a tube, i.e. can be a tubular guide.

In particularly advantageous embodiments, the guide and the cage can be manufactured as a single monolithic body, for instance in a single manufacturing step by additive manufacturing. In less advantageous embodiments, the guide and the cage can be manufactured separately and coupled afterwards into a single integral body.

In some embodiments, the guide and the seat can be manufactured integrally and monolithically in a single manufacturing step, e.g. by additive manufacturing. In other embodiments, the guide and the seat can be manufactured separately and then made to a single integral piece by subsequent coupling.

The valve can further comprise a cover coupled with the cage, The actuation stem of the valve closing member can extend through the cover, such that a distal end of the stem, i.e. an end opposite the closing plate thereof, is accessible for connection to a valve actuator arranged outside the reciprocating machine and outside the cover.

In particularly advantageous embodiments, the valve can comprise a sealing arrangement housed in the guide and co-acting with the actuation stem, to prevent or limit gas leakages along the actuation stem of the valve closing member.

In some embodiments, specifically when the valve is a suction valve, the actuation stem extends through the seat.

When the valve is designed as a suction valve, it may further comprise a guard. The valve closing member can then be arranged between the seat and the guard and adapted to move therebetween from a valve close position to a valve open position.

The seat of the valve can have a replaceable seat plate, for instance made of metal or, in some particularly advantageous embodiments, made of a polymeric material. The replaceable seat plate is located on the side of the seat facing the valve closing member, such that this latter is arranged to contact the replaceable seat plate when the valve closing member is in a valve closing position.

According to another aspect, disclosed herein is a reciprocating machine, in particular a reciprocating compressor, comprising a cylinder and a piston arranged in the cylinder, reciprocatingly moving therein. The cylinder and the piston form at least one compressor chamber, or preferably two compression chambers of a double-acting reciprocating compressor. The reciprocating machine further includes at least one suction valve and at least one deliver valve, both fluidly coupled to the compression chamber. At least one of said valves is designed as described above.

Further features and embodiments of the valves and of the reciprocating machine according to the present disclosure are set forth in the appended claims and will be described in greater detail here on, reference being made to the attached drawings.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

A new and useful actuated valve for reciprocating machines has been developed and is disclosed herein. The novel valve is particularly useful as a suction valve and can be useful as a discharge valve in reciprocating compressors. The valve includes a cage and a valve closing member, i.e. a shutter. The valve closing member is adapted to be drivingly coupled to a control actuator. The valve closing member has an actuation stem, which is guided in a guide integrally formed with the cage of the valve. Effective guidance of the valve closing member is thus obtained. Several additional features of exemplary embodiments and relevant advantages thereof will be described in more detail here below, reference being made to the accompanying drawings.

In the following description embodiments of reciprocating compressor valves will be described. Those skilled in the art will however understand that the actuated valves disclosed herein can be used with advantage also in other reciprocating machines.

Figure 1:
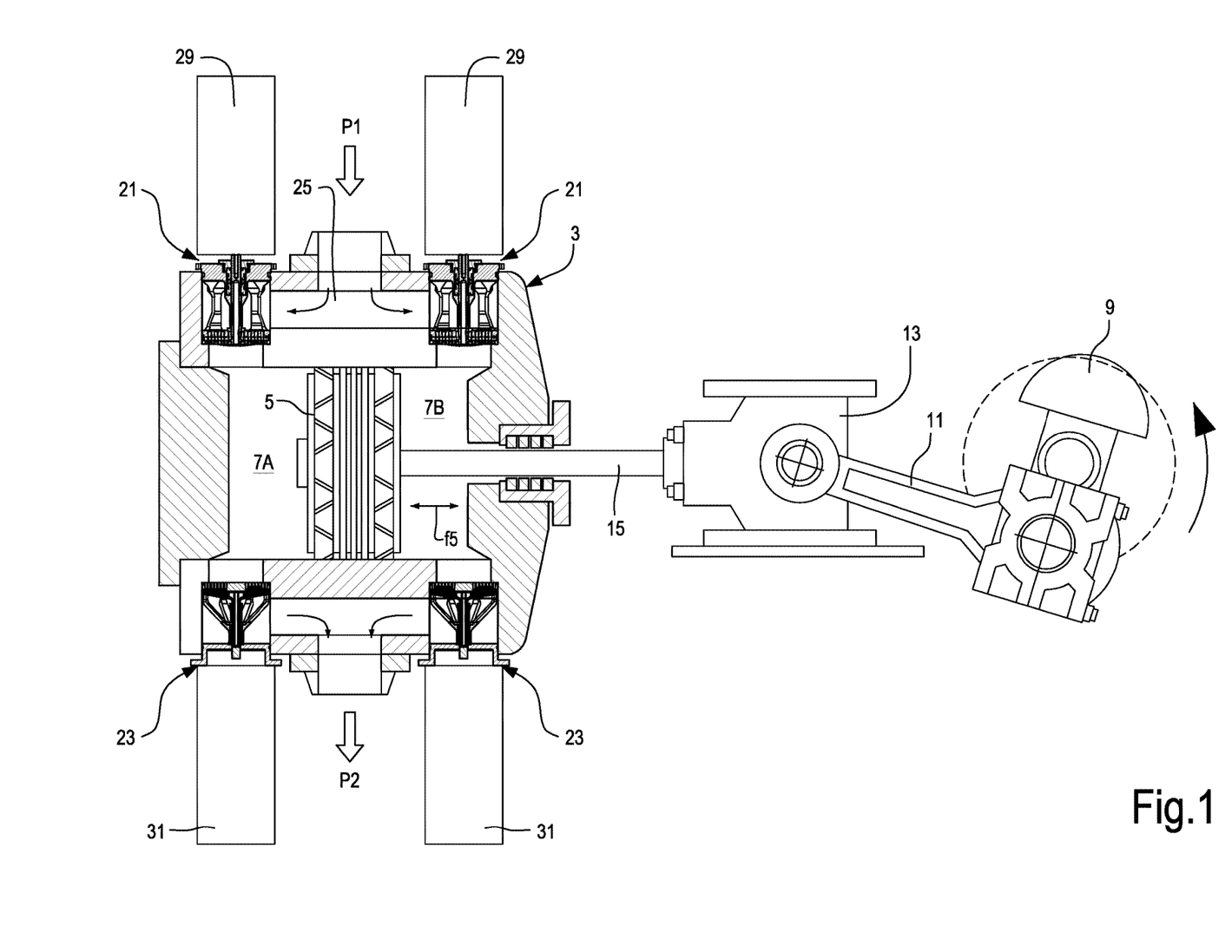
FIG. 1 shows a sectional view of an exemplary double-acting reciprocating compressor including actuated valves according to the present disclosure.

FIG. 1 schematically shows a double-acting reciprocating compressor 1. The reciprocating compressor 1 comprises a cylinder 3 and a piston 5 arranged in the cylinder 3 and adapted to reciprocatingly move therein when the compressor is in use. The piston 5 and the cylinder 3 form two compressor chambers 7A, 7B where a gaseous fluid to be compressed is cyclically sucked and compressed. A crank shaft 9, drivingly coupled to a driver, not shown, transmits motion to the piston 5. The rotary motion of the crank shaft 9 is converted into reciprocating translation motion by a connecting rod 11 ad a crosshead 13, which is connected to the piston 5 by a piston rod 15.

Each compression chamber 7A, 7B is provided with at least one suction valve 21 and one delivery or discharge valve 23, respectively. The suction valves 21 can be fluidly coupled to a suction plenum 25, from which a gaseous fluid at a first, lower pressure P1 is sucked alternatively in the first and second compression chambers 7A, 7B. The discharge valves 23 can be fluidly coupled to a discharge plenum 27, into which the gaseous fluid is discharged at a second, higher pressure P2. A respective actuator, for example an electromagnetic actuator 29, controls each suction valve 21. A respective actuator, for instance an electro-magnetic actuator 31, controls each discharge valve 23. Suitable electromagnetic actuators are disclosed in US2007/0272890, which is incorporated herein by reference.

In operation, the piston 5 moves reciprocatingly according to double arrow f5 inside the cylinder 3 such that gas is cyclically sucked through suction valves 21 at suction pressure P1 and discharged at discharge pressure P2 through discharge valves 23. Opening and closing of the suction valves 21 and discharge valve 23 is controlled by actuators 29 and 31. A more precise control of the compression cycle and of the compressor flowrate can be achieved.

While in FIG. 1 both the suction valves 21 and the discharge valves 23 are fully actuated by actuators 29 and 31, in other embodiments, one, some of all the suction valves 21, or one, some or all discharge valves 23 can be automatic valves. For instance, the suction valves 21 can be fully actuated valves, while the discharge valves 23 can be automatic valves. Actuators on one, some or all suction valves 21 may be used to better control the compressor flowrate.

With continuing reference to FIG. 1, FIGS. 2, 3, 4 and 5 illustrate an exemplary embodiment of a suction valve 21, and the way it can be mounted on the compressor cylinder 3.

Figure 2:
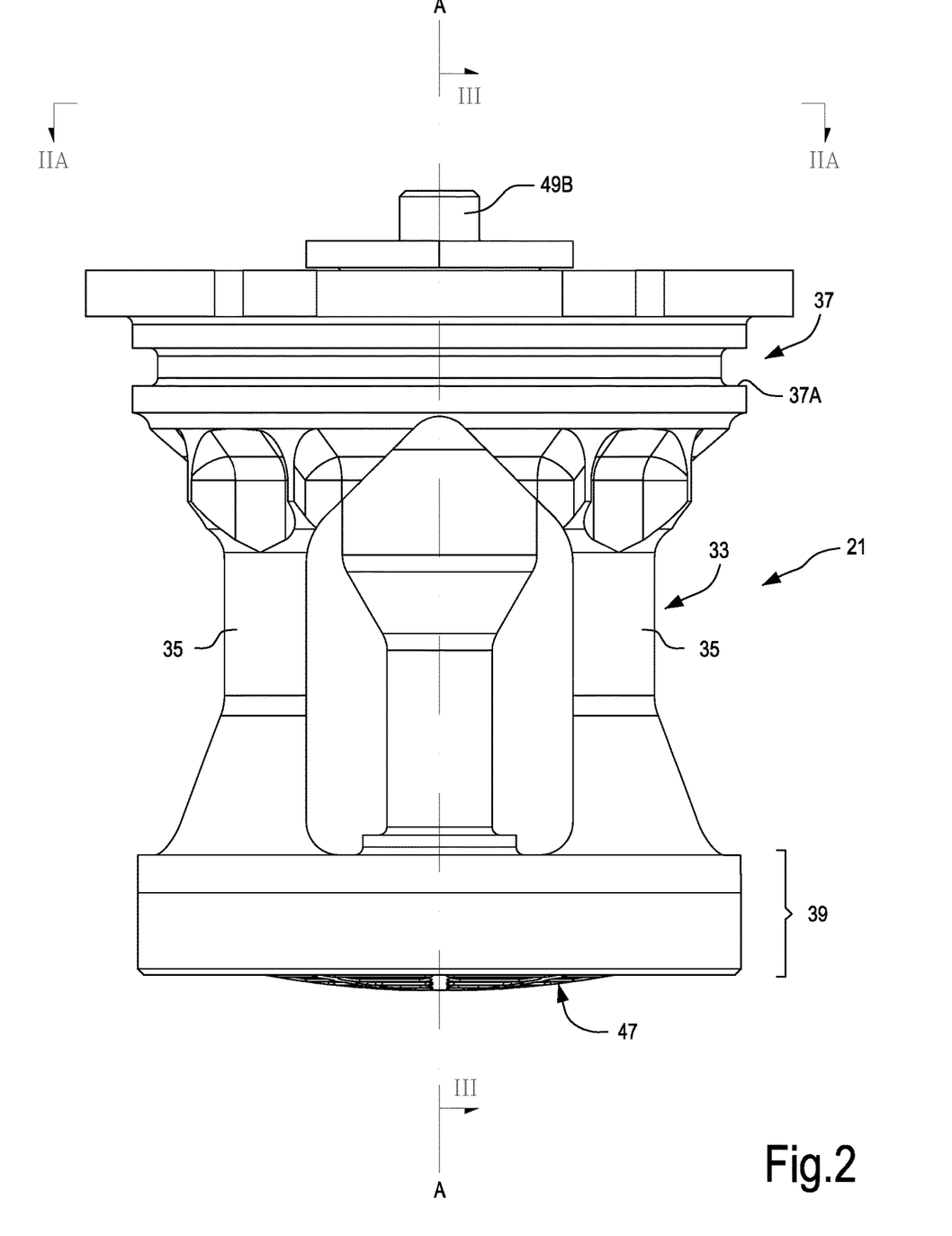
FIG. 2 shows a side view of an open suction valve.
Figure 2A:
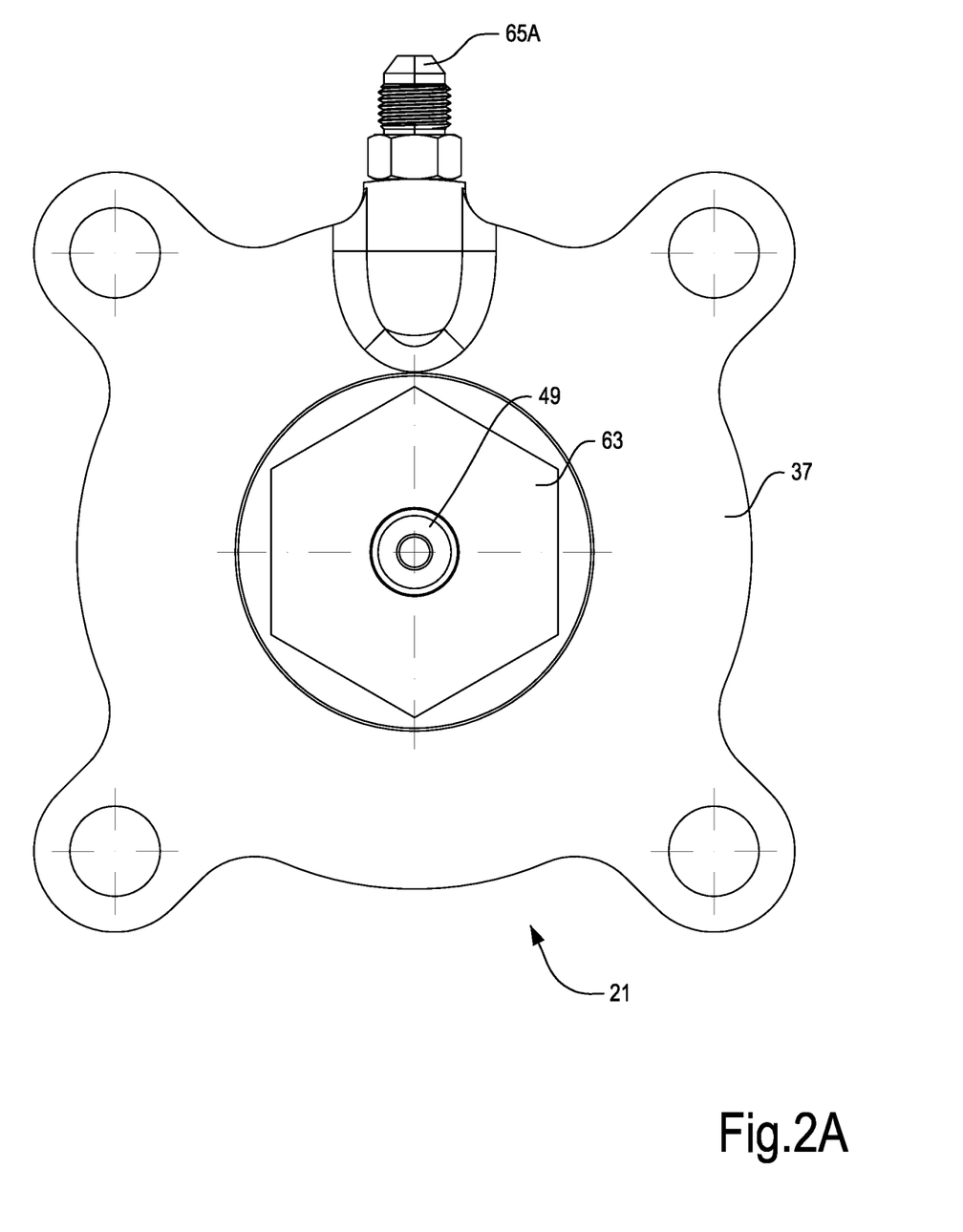
FIG. 2A is a top plan view according to line IIA-IIA of FIG. 2.
Figure 3:
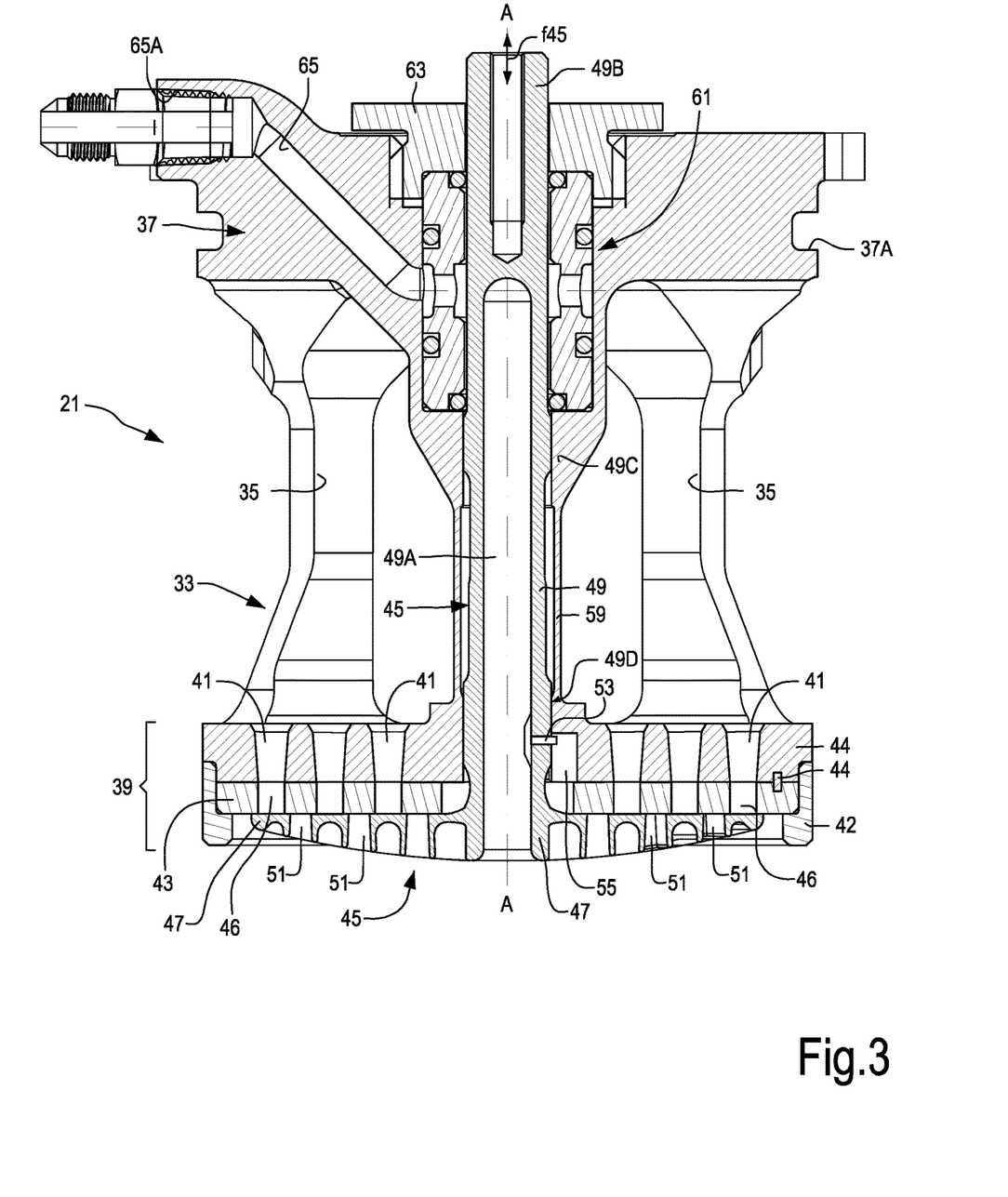
FIG. 3 shows a sectional view according to line of FIG. 2.
Figure 4:
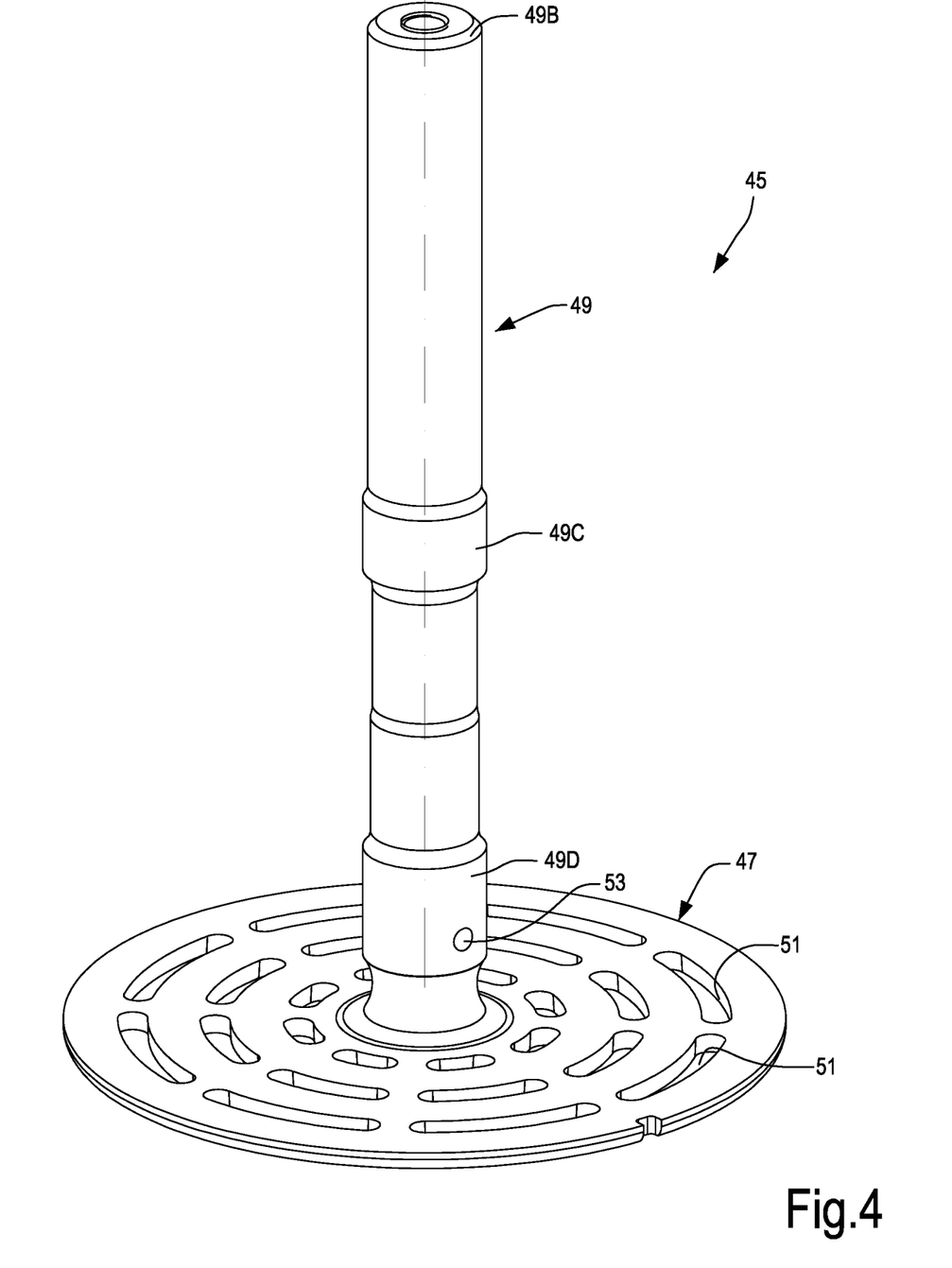
FIG. 4 shows a valve closing member of the valve of FIGS. 1 and 2.

In the embodiment of FIGS. 2, 3 and 4 the suction valve 21 includes a casing or cage 33, which has a set of posts 35 extending between a cover 37 and a seat 39. The posts define flow passages, such that when the valve 21 is arranged in fluid communication with the suction duct or plenum 25, gas can enter the valve and flow therethrough. The seat 39 can include a plurality of suction apertures or ports 41. The apertures 41 can be in the form of elongated and curved ports arranged according to circumferential concentric lines, coaxial with the valve axis A-A. The seat 39 can include a replaceable seat plate 43, which is provided with ports or apertures 46, having the same shape and position as the ports 41. A pin 44 can be used to mount the replaceable seat plate 43 in the correct angular position, such that the apertures 46 and 41 are mutually aligned. A ferrule 42 can be provided to mount the replaceable seat plate 43 on the seat 39.

Figure 5:
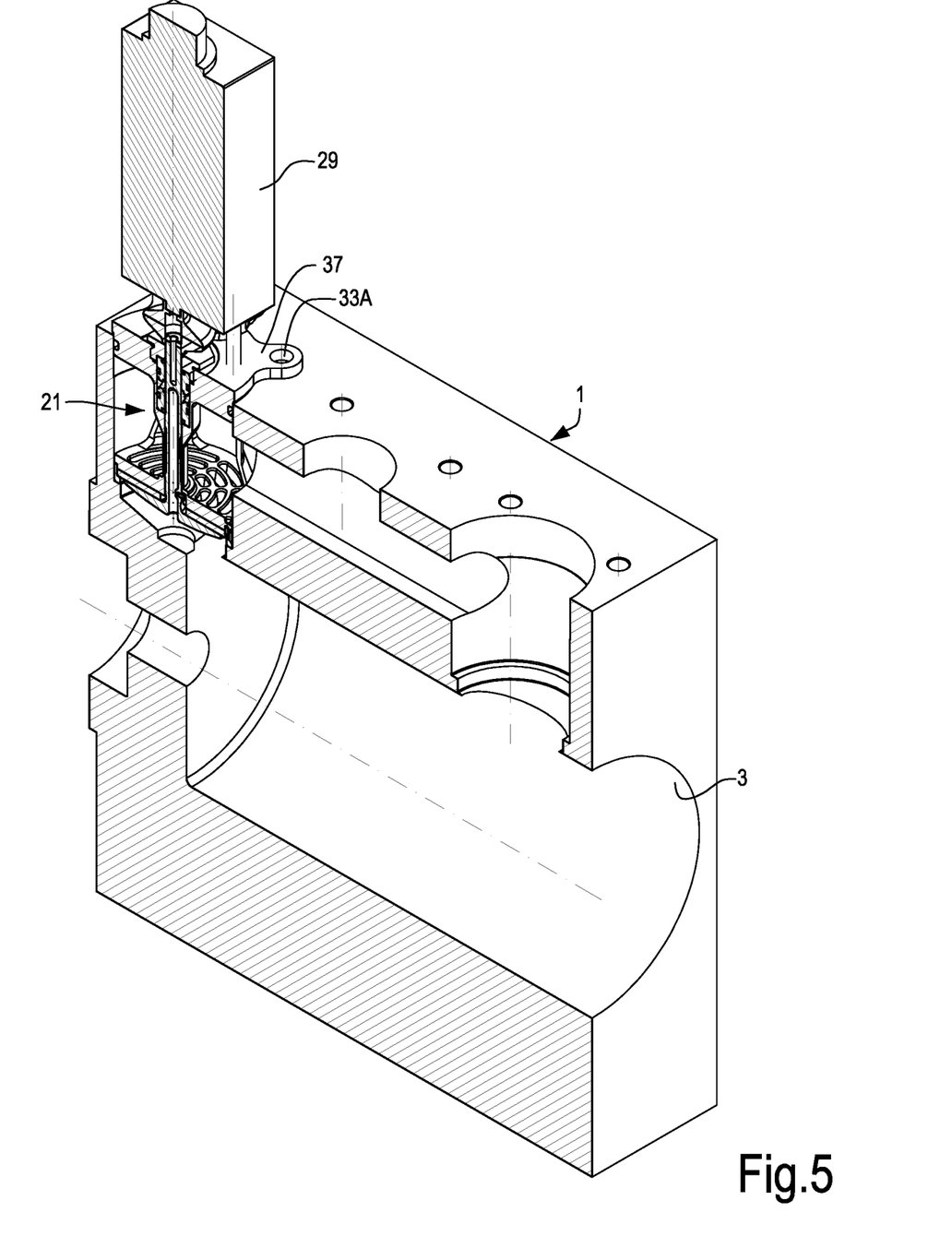
FIG. 5 shows a detail of a compressor cylinder with a suction valve of FIGS. 2 and 3 and relevant actuator mounted thereon.

The cover 37 can be provided with an annular groove 37A adapted to receive an O-ring or any other gasket or sealing member, which provides a seal between the suction valve 21 and the compressor cylinder 3 when the valve 21 is mounted, see FIG. 5.

The suction valve 21 further comprises a valve closing member 45 also referred to as shutter. The valve closing member 45 is illustrated in detail in FIG. 4, separated from the suction valve 21. The valve closing member 45 comprises a plate 47 and a stem 49. The plate 47 includes a plurality of apertures or ports 51, which are shifted with respect to the suction apertures 41, such that the solid (non-perforated) portions of the plate 47 close the suction apertures 41 when the valve closing member 45 is in the closed position, in abutment against the replaceable seat plate 43. In order to mount the valve closing member 45 in the correct angular position with respect to the seat 39, a transverse pin 53 can be provided along the stem 49, said pin slidingly engaging a slot 57 machined in the seat 49.

The valve closing member 45 can be manufactured as a single component, for instance by additive manufacturing. This may reduce manufacturing costs. In other embodiments, however, the plate 47 and the stem 49 can be manufactured separately and then coupled together, e.g. by welding, gluing, soldering, or else by way of screws or bolts.

The valve closing member 45 can be manufactured in metal material. In other embodiments, use of polymeric material is not excluded.

The stem 49 can be hollow (see hole 49A) in order to reduce the mass and therefore the inertia thereof. The axial hole 49A can be closed at the end facing the interior of the compression chamber, to reduce the clearance volume of the compressor. In some embodiments, a honeycomb or other stiffening structure can be provided inside the axial hole 49A. Such structure can easily be manufactured e.g. by additive manufacturing.

In the embodiment of FIG. 3 the plate 47 has a convex lower surface. This can be useful for stiffening the plate 47, since the thickness thereof increases moving radially from the periphery towards the center. However, other embodiments are possible. For example, the plate 47 can be flat (FIG. 4).

The stem 49 extends through the cover 37 such that an end 49B of the stem 49, opposite the plate 47, is accessible from the exterior of the suction valve 21 for coupling to the actuator 29.

In use, the valve closing member 45 is controlled in a reciprocating motion according to double arrow f45 by the actuator 29.

For better guidance of the valve closing member 45 during operation, the stem 49 can be slidingly movable in a guide 59. In the embodiment of FIG. 3 the guide 59 is in the form of a tubular guide, which can extend from the seat 39 to the cover 37. The stem 49 may include one or more annular projections 49C, 49D, forming respective sliding surfaces, in sliding contact with the inner surface of the tubular guide 59. Preferably, the annular projections 49C, 49D are distanced from one another along the axial extension of the stem 49, such that better guidance is achieved. A smooth and efficient guiding action on the stem 49 is thus obtained and buckling of the stem during movement thereof is prevented.

In some embodiments, along the tubular guide 59 and/or in the cover 37 a sealing arrangement 61 is provided. The sealing arrangement 61 can be mounted in an axial seat formed in the cover 37 and/or in the tubular guide 59 by means of a lock nut or any other suitable lock member 63. The lock member 63 has an axial hole, through which the stem 49 extends, such that the distal end 49B thereof projects outside the suction valve 21 for connection to the actuator 29 (see FIG. 5).

By providing a sealing arrangement 61 within the tubular guide 59 and/or the cover 37 a compact valve is obtained, with a reduced axial length. The reduction of the axial extension of the valve members also reduces the total weight of the valve and the weight of the reciprocatingly moving part thereof, namely the valve closing member 45.

A gas recovery duct 65 can be integrated in the valve cage or casing. The gas recovery duct 65 is adapted to recover any gas leakage along the tubular guide 59. By arranging the gas recovery duct 65 inside the structure of the valve cage a compact structure is obtained. The gas recovery duct 65 can end with a connection 65A arranged outside the compressor cylinder and that can be fluidly coupled to a gas recovery circuit, not shown.

In some embodiments, the cage 33 and the cover 37 of the suction valve 21 can be manufactured as a single monolithic block. In other embodiments, the cage 33 and the seat 39, excluding the replaceable seat plate 43, if provided, can be manufactured as a single monolithic body. In yet further embodiments, the cage 33 and the tubular guide 59 can be manufactured as a single monolithic body. In the exemplary embodiment shown herein, the cage 33, including the posts 35, the seat 39, the tubular guide 59 and the cover 37 are formed as a single monolithic body, preferably in one and the same material, for instance metal.

The replaceable seat plate 43 can be manufactured in a polymeric material or metallic material. The polymeric material being softer, impact forces generated by the valve closing member 45 are absorbed and a higher reliability is achieved. Wear is concentrated on the replaceable seat plate, which is less expensive than the valve closing member 45. If a metallic material is used for manufacturing the replaceable seat plate 43, the valve closing member 45 can be advantageously made of a polymeric material, for shock absorption and wear concentration purposes. Polymeric, rather than metallic material for manufacturing the valve closing member 45 is also beneficial in terms of reduced mass of such reciprocatingly movable member.

In particularly advantageous embodiments, the above mentioned components of the suction valve 21 can be manufactured by additive manufacturing. Any additive manufacturing process suitable for the metal material used for this kind of component and adapted to achieve the desired final properties of the component can be used. In some embodiment, additive layer deposition, or powder bed fusion (PBF) can be used, such as by direct metal laser melting (DMLM), electron beam melting (EBM), directed metal laser sintering (DMLS), selective laser melting (SLM), selective laser sintering (SLS) or selective heat sintering (SHS). Other additive manufacturing processes are not ruled out.

In other, presently less preferred embodiments, two or more sections or parts of the stationary components of the valve can be manufactured separately and then assembled to one another, e.g. by soldering or welding to obtain a final component.

By integrating several components of the suction valve 21 in a single body, handling of the valve and assembling thereof in the compressor 1 become simpler and faster and require less technical expertise. The entire valve assembly, including the valve closing member 45 and the replaceable seat plate can be pre-assembled outside the cylinder, and subsequently mounted and fixed to the compressor cylinder by simply screwing bolts through holes 37A of cover 37 (see FIG. 5).

The above described exemplary suction valve is termed sometimes of the "open type", since the valve closing member 45 faces directly the interior of the compression chamber. In other embodiments, the suction valve 21 can be of the so-called "closed type". Suction valves of the closed type are provided with a guard, which is arranged in front of the valve closing member 45, opposite the seat 39. The plate 47 of the valve closing member 45 is thus reciprocatingly movable between the seat and the guard.

Figure 6:
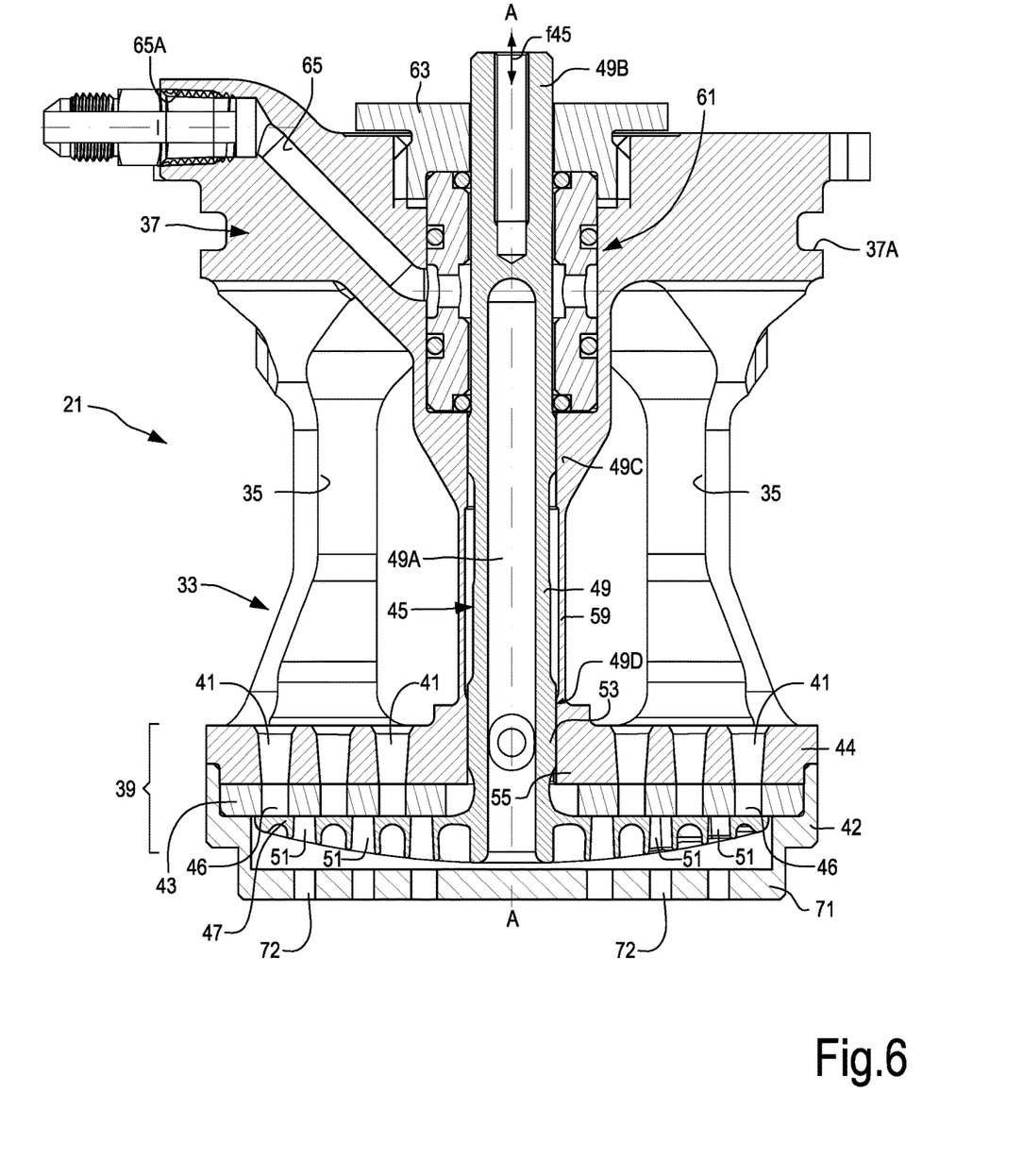
FIG. 6 shows a sectional view of a suction valve according to a further embodiment of the present disclosure.

With continuing reference to FIGS. 1, 2, 3, 4 and 5, a suction valve of the closed type is shown in FIG. 6. The same reference numbers indicate the same parts as already described above in connection with FIGS. 2, 3, 4 and 5; these parts will not be described again.

The main difference between the valve of the open type shown in FIGS. 1, 2, 3, 4 and 5 and the closed type valve of FIG. 6 is that this latter includes a guard 71 provided with ports or apertures 72, which are aligned with the ports or apertures 51 of the plate 47 of the valve closing member 45. The plate 47 of the valve closing member 45 is adapted to move axially between the surface of the guard 71 facing the plate 47 and the replaceable seat plate 43 of the seat 39, i.e. between an open position (plate 47 resting on guard 71) and a closed position (plate 47 resting on the replaceable seat plate 43). The guard 71 can be integral with the ferrule 42 which retains the replaceable seat plate 43 on the valve seat 39.

Figure 7:
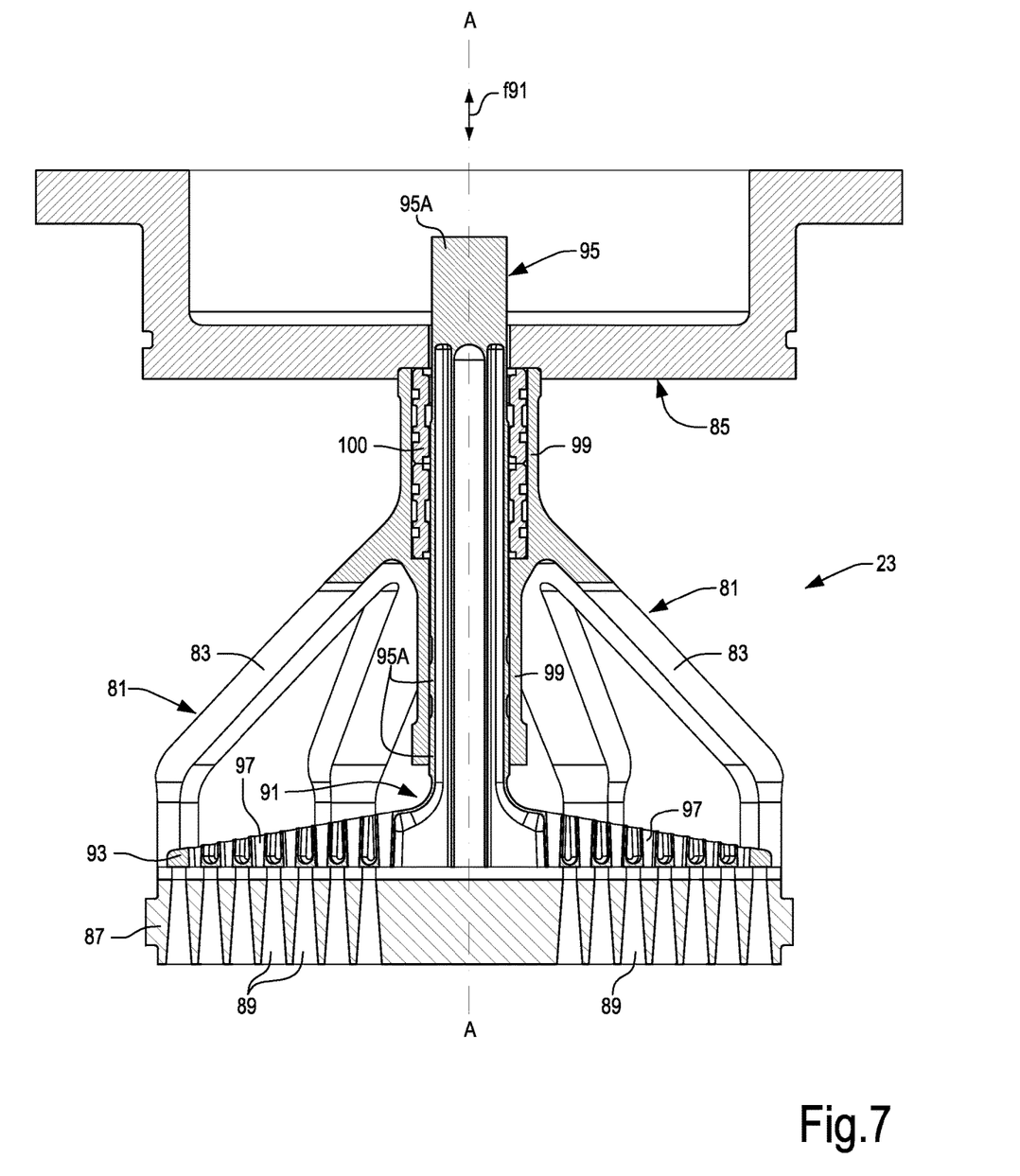
FIG. 7 shows a sectional view of a discharge valve according to the present disclosure.

With continuing reference to FIG. 1, an exemplary embodiment of a discharge valve 23 is shown, in FIG. 7. The discharge valve 23 comprises a cage 81 with posts 83 which extend between a cover 85 and a seat 87. The seat 87 is provided with a plurality of discharge apertures or ports 89. The posts 83 can be connected to the seat 87.

The ports 89 of the seat 87 can be selectively opened and closed by a valve closing member 91, also referred to as shutter, which is adapted to reciprocatingly move according to double arrow f91 between an open position and a closed position. The valve closing member 91 comprises a plate 93 and a stem 95. The plate 93 is provided with ports or apertures 97 which are offset with respect to the apertures or ports 89, such that when the plate 93 is urged against the seat 87 the apertures 89 are closed by the plate 93; when the plate 93 is distanced from the seat 87 compressed gas can flow through the apertures 89 and 97 towards the discharge plenum 27 of the compressor 1.

Similarly to what has been described in connection with FIGS. 2, 3, 4 and 5, also in the discharge valve 23 pins (not shown) can be provided in order to mount the seat 87 and the valve closing member 91 in the correct mutual angular position, such that elongated and curved apertures or ports 97 and 89 will be in the correct mutual position.

The stem 95 is slidingly housed in a tubular guide 99 and can project beyond the cover 85, such that the end 95A of the stem 95 can be coupled to the actuator 31 (FIG. 1; not shown in FIG. 7). Similarly to the stem 49, also stem 95 can be provided with annular portions 95A forming surfaces in sliding and guiding contact with the inner surface of the tubular guide 99. A sealing arrangement 100, similar to the sealing arrangement 66, can be arranged in the tubular guide 99.

In some embodiments the cage 21, the tubular guide 99 and possibly the cover 85 can be formed as a single monolithic body, for instance by additive manufacturing, or else by soldering or welding separate components (cover and cage) together.

Figure 8:
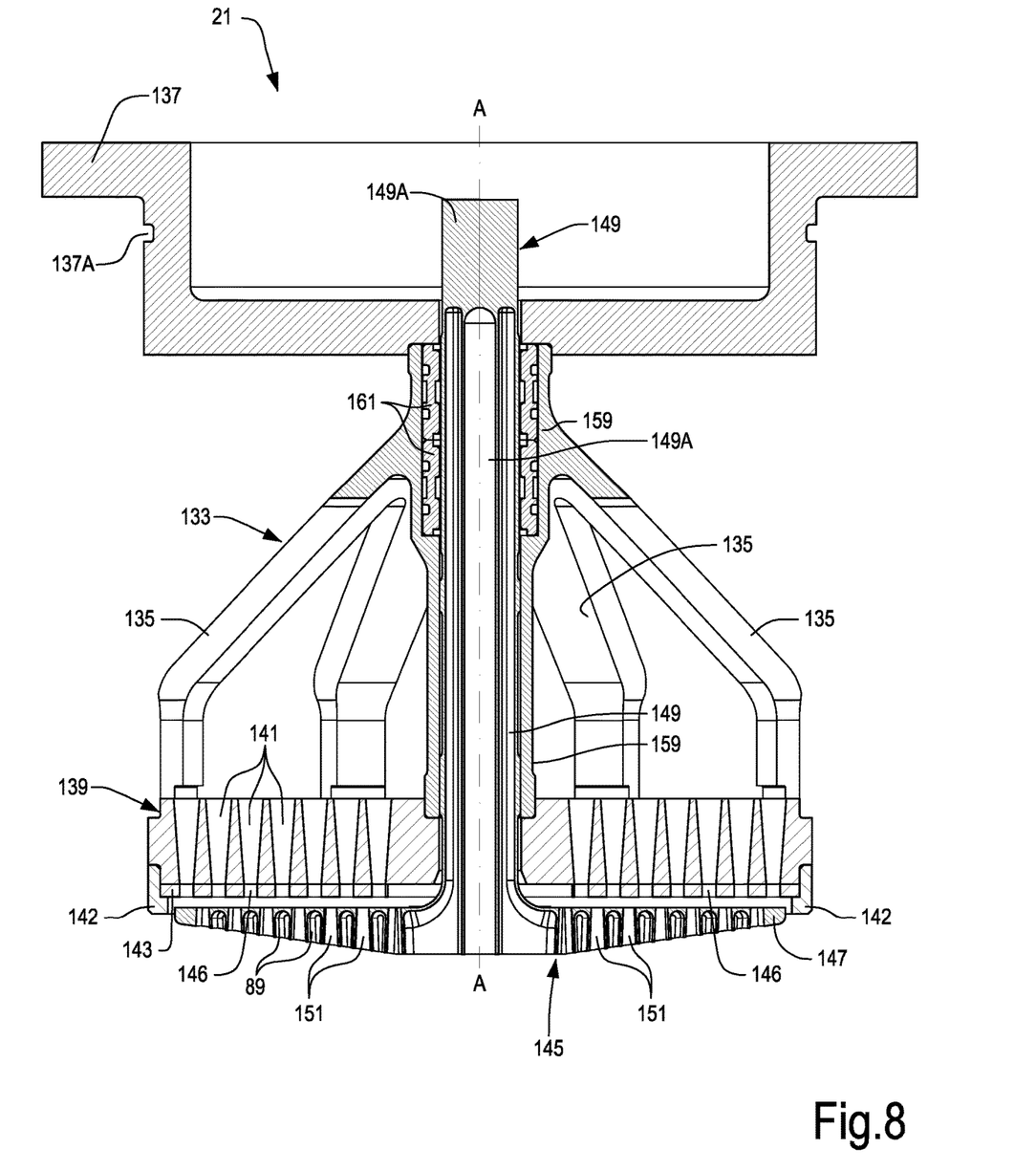
FIG. 8 shows a sectional view of a further embodiment of a suction valve.

With continuing reference to FIG. 1, a further embodiment of a suction valve is shown in FIG. 8. The suction valve of FIG. 8 is again labeled 21 as a whole. Also in the embodiment of FIG. 8 the suction valve 21 includes a casing or cage 133 which has a set of posts 135 extending between a cover 137 and a seat 139. The posts 133 can have portions which are perpendicular to the seat 139 and portions which are inclined and converge towards each other near the cover 137.

The seat 139 can include a plurality of suction apertures or ports 141. The apertures 141 can be in the form of elongated and curved ports arranged according to circumferential concentric lines, coaxial with the valve axis A-A. The seat 139 can include a replaceable seat plate 143, which is provided with ports or apertures 146, having the same shape and position as the ports 141. A ferrule 142 can be provided to mount the replaceable seat plate 143 on the seat 139.

The cover 137 can be provided with an annular groove 137A adapted to receive an O-ring or any other gasket or sealing member, not shown, which provides a seal between the suction valve 21 and the compressor cylinder 3 when the valve is mounted.

The suction valve 21 of FIG. 8 further comprises a valve closing member, i.e. a shutter 145. The valve closing member 145 comprises a plate 147 and a stem 149. The plate 147 includes a plurality of apertures or ports 151 which are shifted with respect to the suction apertures 141, such that the solid (non-perforated) portions of the plate 147 will close the suction apertures 141 when the valve closing member 145 is in the closed position, in abutment against the replaceable seat plate 143.

The valve closing member 145 can be manufactured as a single component, for instance by additive manufacturing. This may reduce manufacturing costs. In other embodiments, however, the plate 147 and the stem 149 can be manufactured separately and then bonded together, e.g. by welding, gluing, soldering, or else by way of screws or bolts.

The stem 149 can be hollow (see hole 149A), in order to reduce the mass and therefore the inertia thereof. As described above in connection with stem 49, also stem 149 can include a honeycomb structure or other stiffening structure in the axial hole 149A. Such structure can easily be manufactured e.g. by additive manufacturing.

The stem 149 extends through the cover 137 such that an end 149B of the stem 149, opposite the plate 147, is accessible from the exterior of the suction valve 21 for coupling to the actuator 129.

The stem 149 is slidingly movable in a tubular guide 159, which can extend from the seat 139 to the cover 137. The stem 149 may include one or more annular projections forming respective sliding surfaces, in sliding contact with the inner surface of the tubular guide 159.

In some embodiments, along the tubular guide 149 and/or in the cover 137 a sealing arrangement 161 is provided, similarly to other embodiments disclosed above.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A valve for a reciprocating machine, comprising:
a seat comprising flow apertures therein;
a valve closing member adapted to co-act with the seat for selectively closing and opening the flow apertures;
a cage integrally coupled to the seat; and
a cover coupled with the cage; and
a guide formed integrally with the cage and extending through the cover,
wherein the valve closing member comprises a stem slidingly arranged in the guide, and a perforated plate formed integrally with the stem and that has a convex lower surface, and
wherein a sealing arrangement is housed in the guide, the sealing arrangement co-acting with the stem to prevent or limit gas leakages along the actuation stem.

2. The valve of claim 1, wherein the cover and the cage are monolithically formed as a single piece.

3. The valve of claim 1, wherein the guide has a tubular shape.

4. The valve of claim 1, wherein the cage comprises a plurality of posts extending between the cover and the seat, and wherein the posts define flow passages.

5. The valve of claim 1, wherein the cover and the cage are monolithically formed as a single piece, wherein the sealing arrangement is locked to the cover or to the guide with a locking member, the stem extending through the locking member.

6. The valve of claim 1, further comprising a gas recovery duct, adapted to recover gas leakages from the sealing arrangement.

7. The valve of claim 1, wherein the stem extends through the seat.

8. The valve of claim 1, wherein the guide is monolithically formed as a single piece with the cage.

9. The valve of claim 1, wherein the seat is monolithically formed as a single piece with the cage.

10. The valve of claim 1, further comprising a guard, wherein the valve closing member is arranged between the seat and the guard and adapted to move therebetween.

11. The valve of claim 1, wherein the seat has a ferrule and a seat plate that is removeable from the ferrule, and wherein the perforated plate is arranged to contact the seat plate when the valve closing member is in a valve closing position.

12. The valve of claim 1, configured as a suction valve or as a delivery valve.

13. A reciprocating compressor comprising:
a cylinder;
a piston arranged reciprocatingly movable in the cylinder;
wherein the cylinder and the piston form at least one compressor chamber;
a suction valve fluidly coupled to the compression chamber;
a deliver valve fluidly coupled to the compression chamber,
wherein at least one of the suction valve and the delivery valve is configured according to claim 1.

* * * * *